(12) United States Patent
Kaliyannan Eswaran et al.

(10) Patent No.: US 12,301,147 B2
(45) Date of Patent: May 13, 2025

(54) GATE DRIVE GROUNDING SCHEME IN MOTOR DRIVE SYSTEMS FOR WIDE INPUT DC LINK VOLTAGE

(71) Applicant: Hamilton Sundstrand Corporation, Charlotte, NC (US)

(72) Inventors: Pravinsharma Kaliyannan Eswaran, Karnataka (IN); Nageswara Rao Kalluri, Karnataka (IN); David Frederick Brookes, Birmingham (GB); Sridhar Katakam, Bangalore (IN); Surendra Somasekhar Valleru, Bangalore (IN)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 192 days.

(21) Appl. No.: 17/994,688

(22) Filed: Nov. 28, 2022

(65) Prior Publication Data

US 2023/0231504 A1 Jul. 20, 2023

(30) Foreign Application Priority Data

Jan. 20, 2022 (IN) .............................. 202211003318

(51) Int. Cl.
H02P 27/08 (2006.01)
(52) U.S. Cl.
CPC .......... H02P 27/08 (2013.01); *H02P 2201/03* (2013.01)
(58) Field of Classification Search
CPC .............................. H02P 27/08; H02P 2107/03
See application file for complete search history.

(56) References Cited

U.S. PATENT DOCUMENTS

| | | | |
|---|---|---|---|
| 8,482,328 B2* | 7/2013 | Kim | H03K 17/168 327/108 |
| 8,766,570 B2 | 7/2014 | Geyer et al. | |
| 8,947,899 B2 | 2/2015 | Savatski et al. | |
| 9,431,918 B2 | 8/2016 | Zhang et al. | |

(Continued)

FOREIGN PATENT DOCUMENTS

| | | |
|---|---|---|
| EP | 2787625 A1 | 10/2014 |
| JP | 2003324972 A | 11/2003 |
| JP | 2014135838 A | 7/2014 |

OTHER PUBLICATIONS

Search Report issued in European Patent Application No. 23152489.3; Application Filing Date Jan. 19, 2023; Date of Mailing May 31, 2023 (7 pages).

*Primary Examiner* — Rina I Duda
(74) *Attorney, Agent, or Firm* — CANTOR COLBURN LLP

(57) ABSTRACT

A motor drive system includes a direct current (DC) bus that provides a DC link voltage across a DC link capacitor, and a split DC link mid-point circuit connected in parallel with the DC link capacitor. The split DC link mid-point circuit establishes a mid-point reference based on the DC link voltage. A power inverter is in signal communication with the DC bus. The power inverter includes one or more gate driver units configured to drive one or more corresponding switches. Each gate driver unit includes a mid-point ground connection that is connected to the mid-point reference. The split DC link mid-point circuit can define a voltage divide that establishes the mid-point reference and can be used to monitor the DC link voltage.

17 Claims, 4 Drawing Sheets

(56) References Cited

U.S. PATENT DOCUMENTS

| | | | |
|---|---|---|---|
| 9,555,711 B2 | 1/2017 | White et al. | |
| 9,590,529 B2 * | 3/2017 | Akiyama | H02M 1/088 |
| 9,929,729 B2 * | 3/2018 | Nam | H03K 17/168 |
| 10,044,258 B2 * | 8/2018 | Bryant | H02M 5/04 |
| 10,110,149 B2 | 10/2018 | Wagoner et al. | |
| 10,523,130 B2 | 12/2019 | Bax et al. | |
| 2018/0054140 A1 | 2/2018 | Chen et al. | |
| 2019/0181857 A1 * | 6/2019 | Caiafa | H03K 17/691 |
| 2019/0372504 A1 * | 12/2019 | Satou | H02P 29/024 |
| 2021/0288605 A1 | 9/2021 | Vanevenhoven et al. | |

* cited by examiner

GATE DRIVE GROUNDING SCHEME IN MOTOR DRIVE SYSTEMS FOR WIDE INPUT DC LINK VOLTAGE

CROSS-REFERENCE TO RELATED APPLICATIONS

This application claims the benefit of Indian Application No. 202211003318 filed Jan. 20, 2022, the disclosure of which is incorporated herein by reference in its entirety.

BACKGROUND

The subject matter disclosed herein generally relates to a motors and motor control and, more particularly, to a gate drive grounding scheme in a motor drive systems for wide input DC link voltage.

Aircraft systems commonly include a variety of motor controlled systems. It is common for a motor controlled system to include a motor drive system (typically referred to as a motor drive) to control surfaces (e.g., ailerons, elevators or stabilators, or rudders), aircraft components environmental control systems, and the like. Aircraft motor drives typically include a front-end rectifier and a downstream power inverter. The front-end rectifier operates to convert an externally supplied high voltage AC supply to a rectified high voltage direct current (DC) input. The power inverter is typically constructed using a network of switches such as insulated-gate bipolar transistors (IGBTs) or metal-oxide-semiconductor field-effect transistors (MOSFETs) to convert the rectified high voltage DC input to a multi-phase AC voltage capable of driving a load, e.g., a motor. The motor, in turn, can drive an actuator to control movement of one or more control surfaces.

The front-end rectifier and the power inverter are generally separated by a DC bus, which includes a DC link established using a DC link capacitor. The DC link capacitor is typically connected in parallel between the positive and negative conductors of the DC bus and serves to smooth the DC voltage output of the front-end rectifier. The DC link capacitor also protects upstream circuits from the transient response of downstream circuits.

BRIEF DESCRIPTION

According to a non-limiting embodiment, a motor drive system includes a direct current (DC) bus that provides a DC link voltage across a DC link capacitor, and a split DC link mid-point circuit connected in parallel with the DC link capacitor. The split DC link mid-point circuit establishes a mid-point reference based on the DC link voltage. A power inverter is in signal communication with the DC bus. The power inverter includes one or more gate driver units configured to drive one or more corresponding switches. Each gate driver unit includes a mid-point ground connection that is connected to the mid-point reference. The split DC link mid-point circuit can define a voltage divide that establishes the mid-point reference and can be used to monitor the DC link voltage.

The motor drive system further includes a feature, wherein the split DC link mid-point circuit comprises a plurality of capacitors that are connected across the DC bus; and a plurality of resistors that are connected in parallel with the plurality of capacitors.

The motor drive system further includes a feature, wherein the plurality of capacitors and the plurality of resistors are connected to one another at a mid-point node to establish the mid-point reference.

The motor drive system further includes a feature, wherein a voltage at the mid-point node is half the DC link voltage.

The motor drive system further includes a feature, wherein the at least one gate driver unit comprises an isolated gate driver configured to drive the switch based on a PWM signal, the isolated gate driver including a second mid-point voltage connection that receives the mid-point voltage and a second mid-point ground connection that is connected to the mid-point reference; and a digital isolator configured to establish an isolation barrier between digital control circuitry and the isolated gate driver, and configured to transfer the PWM signal across the isolation barrier to the isolated gate driver.

The motor drive system further includes a feature, wherein the switch is connected to a load, and wherein the isolated gate driver operates the switch to drive the load.

The motor drive system further includes a feature, wherein the load is a three-phase motor.

The motor drive system further includes a feature, wherein the split DC link mid-point circuit establishes a voltage divider configured to provide voltage monitoring of the DC link voltage.

The motor drive system further includes a feature, wherein the split DC link mid-point circuit comprises a first capacitor and a second capacitor connected in series with one another to define a pair of capacitors that are connected across the DC bus; and a first resistor and a second resistor connected in series with one another to define a pair of resistors that are connected in parallel with the pair of capacitors, wherein the pair of capacitors and the pair of resistors each have a center-tap that is connected to the mid-point node to establish the mid-point reference.

The motor drive system further includes a feature, wherein the split DC link mid-point circuit further comprises the first capacitor including a first terminal connected to a positive rail of the DC bus; the second capacitor including a first terminal connected to an opposing terminal of the first capacitor to form a first center node and including a second terminal connected to a negative rail of the DC bus; the first resistor including a first terminal connected to the positive rail of the DC bus; and the second resistor including a first terminal connected to an opposing second terminal of the first resistor to form a second center node and including a second terminal connected to the negative rail of the DC bus.

The motor drive system further includes a feature, wherein the first center node and the second center node are commonly connected to the mid-point node to establish the mid-point reference.

According to another non-limiting embodiment, a method of grounding a gate driver unit included in a motor drive system comprises delivering a DC link voltage across a direct current (DC) link capacitor connected across a DC bus, and connecting a split DC link mid-point circuit in parallel with the DC link capacitor to establish a mid-point reference based on the DC link voltage. The method further comprising grounding the gate driver to the mid-point reference, delivering the DC link voltage to a power inverter in signal communication with the DC bus, using the DC link voltage to operate a gate driver unit included in the power inverter, and driving a switch included in the power inverter in response to powering the gate driver.

The method further includes a feature, wherein establishing the mid-point reference comprises connecting a plurality of capacitors across the DC bus; connecting a plurality of resistors in parallel with the plurality of capacitors; and connecting the plurality of capacitors and the plurality of resistors to one another at a common mid-point node to establish the mid-point reference.

The method further includes a feature, wherein a voltage at the mid-point node is half the DC link voltage.

The method further includes a feature, wherein operating the gate driver unit comprises establishing, using a digital isolator, an isolation barrier between digital control circuitry and an isolated gate driver included in the gate driver unit; delivering a PWM signal to the digital isolator; transferring the PWM signal across the isolation barrier and to the isolated gate driver; and operating the isolated gate driver based on the PWM signal so as to drive the switch.

The method further includes a feature, wherein operating the gate driver unit further comprises connecting voltage inputs of the digital isolator and the isolated gate driver to a common mid-point voltage; and connecting ground inputs of the digital isolator and the isolated gate driver to the mid-point reference.

The method further includes a feature, further comprising using the split DC link mid-point circuit as a voltage divider monitoring to monitor the DC link voltage.

The method further includes a feature, wherein establishing the mid-point reference further comprises connecting a first capacitor and a second capacitor in series with one another to define a pair of capacitors that are connected across the DC bus; connecting a first resistor and a second resistor in series with one another to define a pair of resistors that are connected in parallel with the pair of capacitors; and connecting a center-tap of the pair of capacitors and a center-tap of the pair of resistors to the mid-point node to establish the mid-point reference.

The method further includes a feature, wherein establishing the mid-point reference further comprises connecting a first terminal of the first capacitor to a positive rail of the DC bus; connecting an opposing second terminal of the first capacitor to a first terminal of a second capacitor to form a first center node; connecting an opposing second terminal of the second capacitor to a negative rail of the DC bus; connecting a first terminal of the first resistor to the positive rail of the DC bus; connecting an opposing second terminal of the first resistor to a first terminal of a second resistor to form a second center node; connecting an opposing second terminal of the second resistor to the negative rail of the DC bus; and connecting the first center node and the second center node in common with the mid-point node to establish the mid-point reference.

The foregoing features and elements may be combined in various combinations without exclusivity, unless expressly indicated otherwise. It should be understood, however, that the following description and drawings are intended to be illustrative and explanatory in nature and non-limiting.

BRIEF DESCRIPTION OF THE DRAWINGS

The foregoing and other features, and advantages of the present disclosure are apparent from the following detailed description taken in conjunction with the accompanying drawings in which.

DETAILED DESCRIPTION

Figure 1:
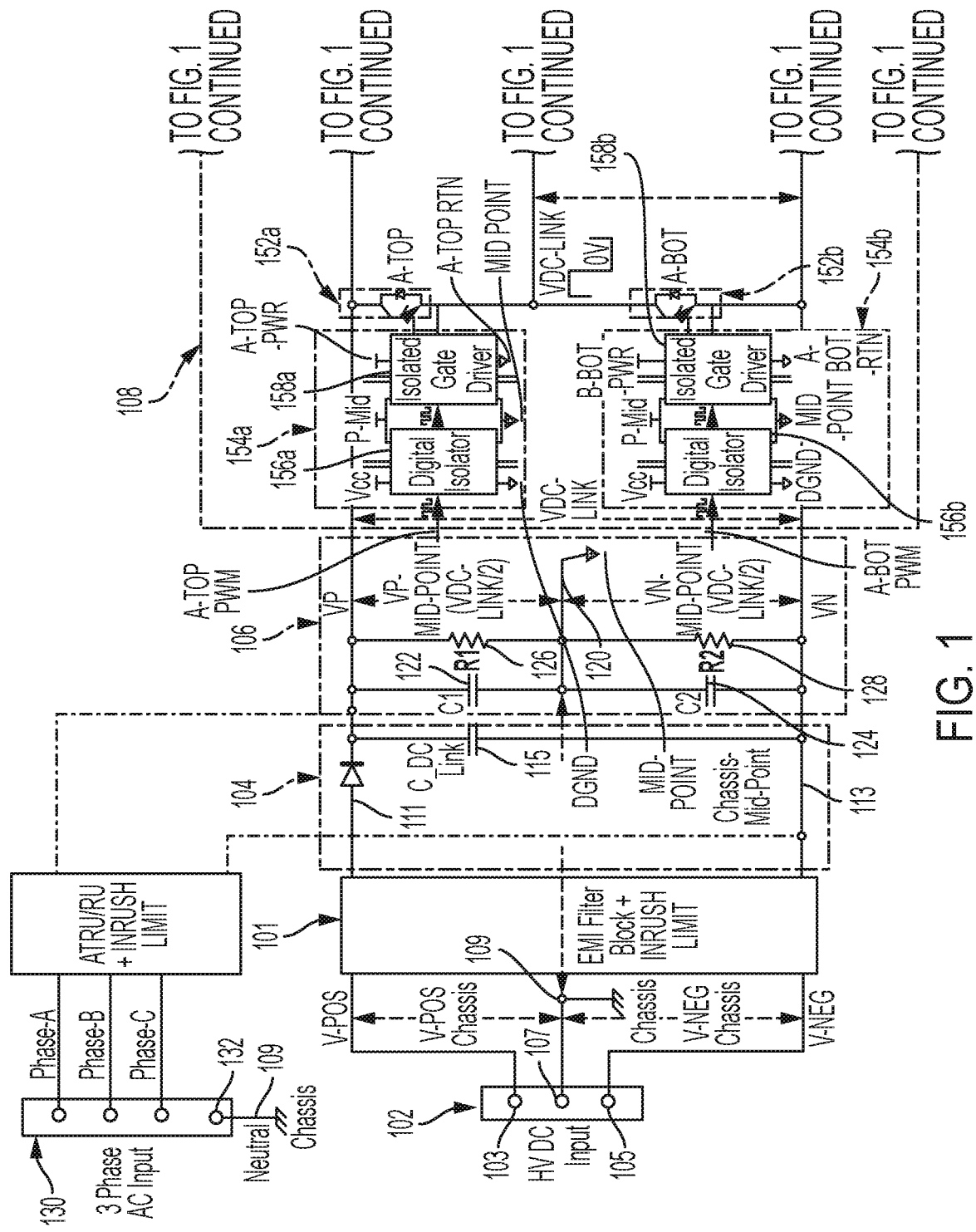
FIG. 1 is a schematic diagram of a motor drive system according to a non-limiting embodiment.
Figure 1:
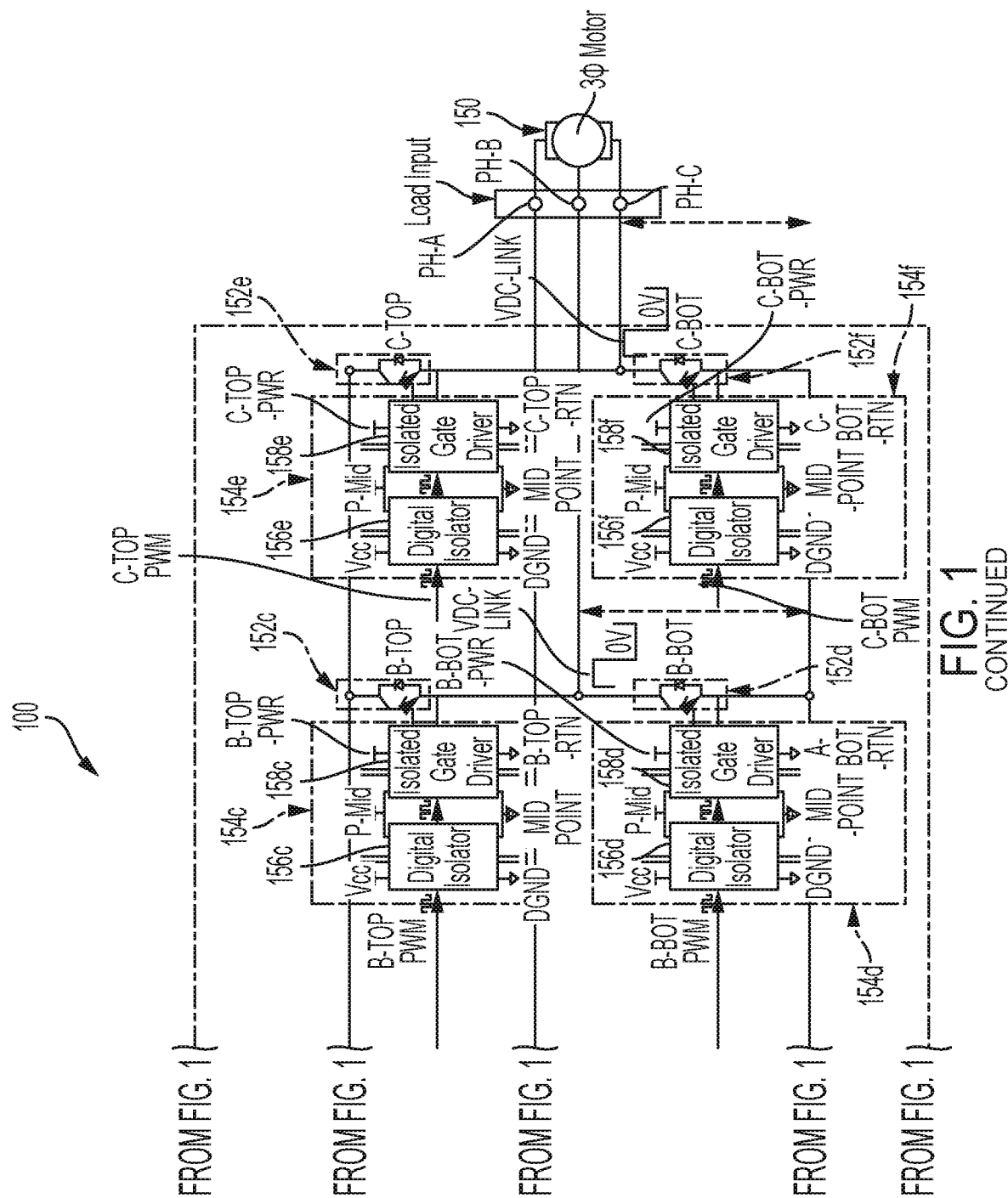

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended. The following description is merely illustrative in nature and is not intended to limit the present disclosure, its application or uses. It should be understood that throughout the drawings, corresponding reference numerals indicate like or corresponding parts and features. As used herein, the term controller refers to processing circuitry that may include an application specific integrated circuit (ASIC), an electronic circuit, an electronic processor (shared, dedicated, or group) and memory that executes one or more software or firmware programs, a combinational logic circuit, and/or other suitable interfaces and components that provide the described functionality.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

Turning to an overview of technologies that are more specifically relevant to aspects of the present disclosure, achieving working isolation in higher DC link bus voltages poses a challenge in maintaining creepage and clearance as per industry and organizational reliability standards and guidelines. In general, higher DC voltage increases the insulation distance requirements and device ratings. When it comes to the operation of IGBT/MOSFET gate drivers and gate power supplies at high altitudes, the situation worsen further by increasing the insulation distances. If the application requires safety insulation between high to low voltage, additional insulation margin increases the distance and device ratings.

It is common for a conventional motor drive system to implement a DC link voltage that has a wide operating range to account for a wide-variety of conditions such as, for example, transient, normal and abnormal conditions. Selecting the insulation rating of the gate drive devices and PCB's distance is a challenge based on the highest voltage available on the bus. In addition, the common mode voltage between DC link rails (Vp, Vn) to a chassis reference point further increases the isolation voltage (working or safety) and it could pose further constraints to identify the right isolation devices. Any increase in the common mode voltage from a source or established within the installation increases the isolation rating of the solution.

Conventional motor drive systems utilize the chassis ground reference as the ground connection for the gate driver; typically via a large value resistor. During operation, however, the gate driver and its power supply isolations may experience bipolar voltage across an isolation barrier (magnetic, capacitive or optical). In some instance, the bipolar voltage can be of asymmetrical around zero reference which can create saturation/fault condition over an operating period in magnetic based isolation. Any increase in clearance and creepage distances increase the cost and area of overall isolation. Also, it is not uncommon for commercially off the shelf (COTS) devices to have different specifications for unipolar/bipolar isolation voltage ratings which constrains the selection based on isolation voltage across the barrier in an application.

Turning now to a more detailed description of the inventive teachings, one or more non-limiting embodiments of the present disclosure provide a motor drive system that includes a gate drive grounding scheme for wide input DC link voltages. The gate drive ground scheme establishes a mid-point reference (referred to herein as "MID POINT") that is connected from gate drive area (between digital isolator and isolated gate drive) to an internally created split DC link voltage that is established by a split DC line voltage circuit. This split DC link voltage can be utilized as a mid-point reference to the gate drive isolated region. In one or more non-limiting embodiments, the split DC line voltage can be established by a split DC link mid-point circuit, which includes a pair of series-connected capacitors and a pair of series-connected resistors. It should be appreciated, however, that more than two series-connected components can be implemented to meet various targeted voltage ratings. The series-connected capacitors are connected across the positive and negative rails, and the series-connected resistors connected in parallel with the series-connected capacitors. The series-connected capacitors and series-connected resistors are center-tapped and tied together to establish the mid-point. In one or more non-limiting embodiments, the established mid-point is half the DC link voltage with tight tolerance. Accordingly, the established mid-point reduces voltage variations and improves the isolation rating of the motor drive system.

With reference now to FIG. 1, a motor drive system 100 is illustrated according to a non-limiting embodiment. The motor drive system 100 includes a high-voltage DC input 102, a DC bus 104, a split DC link mid-point circuit 106, and a power inverter 108. The high-voltage DC input 102 receives high-voltage DC that is used in part to establish the DC bus 104. The high-voltage DC input 102 includes a positive rail connection 103, a negative rail connection 105, and a chassis connection 107. The chassis connection 107 is connected to chassis reference point 109. The chassis reference point 109 is connected in common with a neutral connection 132 of a three-phase AC source 130.

The high-voltage DC input 102 can receive the high-voltage DC from a rectifier circuit (not shown). The rectifier circuit can operate as an AC-DC converter (ADC) to convert an alternating current (AC) voltage generated by the three-phase AC source 130 to the high-voltage DC input. In one or more non-limiting embodiments, an electromagnetic interference (EMI) filter 101 is interposed between the high-voltage DC input 102 and the DC bus 104. The EMI filter 101 is configured to remove electromagnetic noise from appearing on the DC bus 104, while also limiting DC in-rush to the motor drive system 100.

The DC bus 104 is configured to deliver the high-voltage DC to the power inverter 108. The DC bus 104 includes a positive voltage rail (VP) 111, a negative voltage rail (VN) 113, and a DC link capacitor 115. The positive voltage rail 111 is in signal communication with the positive rail connection 103 via the EMI filter 101. Similarly, the negative voltage rail 113 is in signal communication with the negative rail connection 105 via the EMI filter 101. The voltage differential between the positive voltage rail 111 and the negative voltage rail 113 defines a DC link voltage (VDC-LINK). The DC link capacitor 115 is connected across the DC bus 104. For instance, a first terminal of the DC link capacitor 115 is connected to the positive rail 111 while an opposing second terminal of the DC link capacitor 115 is connected to the negative rail 113. Accordingly, the DC link capacitor 115 can serve to smooth the DC voltage that is applied to the DC bus 104 and delivered to the power inverter 108. The DC link capacitor 115 is also configured to protect upstream circuits from transient responses that may occur in downstream circuits.

The split DC link mid-point circuit 106 is connected between the DC bus 104 and the power inverter 108. The split DC link mid-point circuit 106 can establish a voltage-divider circuit that can be used to monitor the DC link voltage. For example, as the DC link mid-point circuit 106 used to establish a mid-point reference node (MID POINT) 120, which is essentially resistive in nature, it is possible to introduce a voltage divider as part of the network in the usual way to those skilled in the art. This allows the DC link mid-point circuit 106 to establish the mid-point reference node (MID POINT) 120, which can be multi-purposed. The ratio of the voltage may be such that the voltage across the elements connected to the MID POINT 120 are within the working range of an analogue to digital converter. The voltage may be sensed either side of the MID POINT 120 or, in the case of a unipolar ADC, just the positive element with the mid-point used as the ground. Accordingly, measurements at the mid-point reference node 120.

According to one or more non-limiting embodiments, the mid-point reference node (MID POINT) 120 effectively establishes an internally created split DC link voltage, which can be used as a mid-point reference point 120 for the gate drive isolation regions included in the power inverter 108. Accordingly, the mid-point reference node 120 can provide a reference to the gate drive isolation regions as described in greater detail below.

In one or more non-limiting embodiments, the split DC link mid-point circuit 106 includes a pair of series-connected capacitors 122, 124 and a pair of series-connected resistors 126, 128. The series-connected capacitors 122, 124 are connected across the positive and negative rails 111 and 113. The series-connected resistors 126 and 128 are also connected across the positive and negative rails 111 and 113 and are connected in parallel with the series-connected capacitors 122 and 124. The series-connected capacitors 122, 124 and series-connected resistors 126, 128 are center-tapped and tied together to establish the mid-point 120. In one or more non-limiting embodiments, the voltage appearing at the established mid-point 120 is half the DC link voltage, i.e., the voltage appearing across the positive and negative rails 111 and 113.

The power inverter 108 is configured to convert the rectified high voltage DC provided by the DC input 102 into a multi-phase AC voltage capable of driving a load 150, e.g., a three-phase motor 150. The power inverter 108 includes a network of switches 152a, 152b, 152c, 152d, 152e, 152f, each configured to be driven by a respective gate driver unit 154a, 154b, 154c, 154d, 154e, 154f (referred to generally as 154n). Each switch 152a, 152b, 152c, 152d, 152e, 152f, (referred to generally as 152n) can be implemented using insulated-gate bipolar transistors (IGBTs) or metal-oxide-semiconductor field-effect transistors (MOSFETs).

Each gate driver unit 154a, 154b, 154c, 154d, 154e, 154f (referred to generally as 154n) includes a digital isolator (between the control electronics and power stage mid-point) 156a, 156b, 156c, 156d, 156e, 156f (generally referred to as 156n) and an isolated gate driver 158a, 158b, 158c, 158d, 158e, 158f (generally referred to as 158n). Each digital isolator 156n includes an input that receives a first PWM signal (e.g., B-TOP-PWM) and an output configured to deliver a second PWM signal. Each digital isolator 156n is configured to establish an isolation barrier between digital control circuitry and an isolated gate driver 156n, while also configured to transfer the PWM signal across the isolation barrier to a corresponding isolated gate driver 158n. In one or more non-limiting embodiments, a digital controller including digital logic circuitry generates the PWM signal, which is delivered to the digital isolators 156n. The digital isolators 156n relay the PWM signal to the isolated gate drivers 158n, while providing safety isolation to the control circuitry in the event of one or more gate drivers 158n experience a fault. In other words, the digital isolator 156n delivers the PWM signal to a corresponding isolated gate driver 158n, while also serving as a secondary level of isolation (e.g., functional isolation) for protecting the control side (e.g., $V_{CC}/D_{GND}$) of the gate driver unit 154n from high-voltage damage potentially caused by a failure of the functional isolation in the gate driver 158n.

The isolated gate drivers 158n can be constructed, for example, using an isolated gate drive circuit and an associated isolated gate drive power supply circuit. The isolated gate drivers 158n each include an input that receives the PWM signal output from the digital isolator 156n and an output connected to a gate of the switch 152n. Accordingly, the isolated gate driver 158n delivers the PWM signal to the gate to operate the switch 152n according to the frequency of the PWM signal The isolated gate driver 158n further includes a gate connection, a source connection, a power connection (PWR), a return connection (RTN), a power midpoint connection (P-MID), and a midpoint ground connection (MID POINT). The gate connection is connected to a gate of the corresponding switch 152n and the source connection is connected to a source of the switch 152n. The power connection (PWR) is configured to receive power output from a multi-mode DC power supply 200 (see FIG. 2). The return connection (RTN) is connected to a ground return reference point established by the multi-mode DC power supply 200. The power midpoint connection (P-MID) connection is connected to a power midpoint connection (P-MID) established by the multi-mode DC power supply 200 to receive a DC power signal. The DC power signal provided by the power midpoint connection (P-MID) has a typical voltage of about 15 volts (V), but can have a voltage ranging, for example, from about 10 V to about 20 V The gate driver mid-point connection ("MID POINT") is connected to the mid-point connection (MID POINT) 120 established by the split DC line voltage circuit 106.>

Unlike conventional motor drive systems, the gate driver units 154n do not use an earth or chassis ground referenced connection, e.g., the chassis reference point 109, as the gate driver unit ground connection. Rather, the gate driver units 154n utilize the mid-point connection (MID POINT) 120 established by the split DC line voltage circuit 106. In this manner, the mid-point connection (MID POINT) 120 prevents ground faults occurring on the conductive casing (e.g., chassis) from propagating into the gate driver units 154n, while reducing or even completely removing common mode noise injection into the gate driver units 154n. Establishing the mid-point connection (MID POINT) 120 as part of the DC link mid-point circuit 106 also facilitates monitoring of the DC-Link voltage and allows for detecting failures at the MID-POINT connection 120. When this function is implemented, more than one resistor is used above and below the mid-point to form a potential divider, and provide a proportional but reduced voltage to the monitoring circuit.

Grounding the gate driver units 154n to the mid-point connection (MID POINT) 120 rather than the chassis reference point 109 allows higher de-rating guidelines on transformer isolation & working isolation ratings. The mid-point ground scheme described herein also establishes an isolation of the gate driver units 154n that is completely independent of common mode voltages, while also establishing a digital isolation (e.g., between the mid-point connection (MID-POINT) and digital isolator ground connection (DGND)) that reduces significantly to the common mode voltage ratings of the solution not the operating DC bus voltage.

Figure 2:
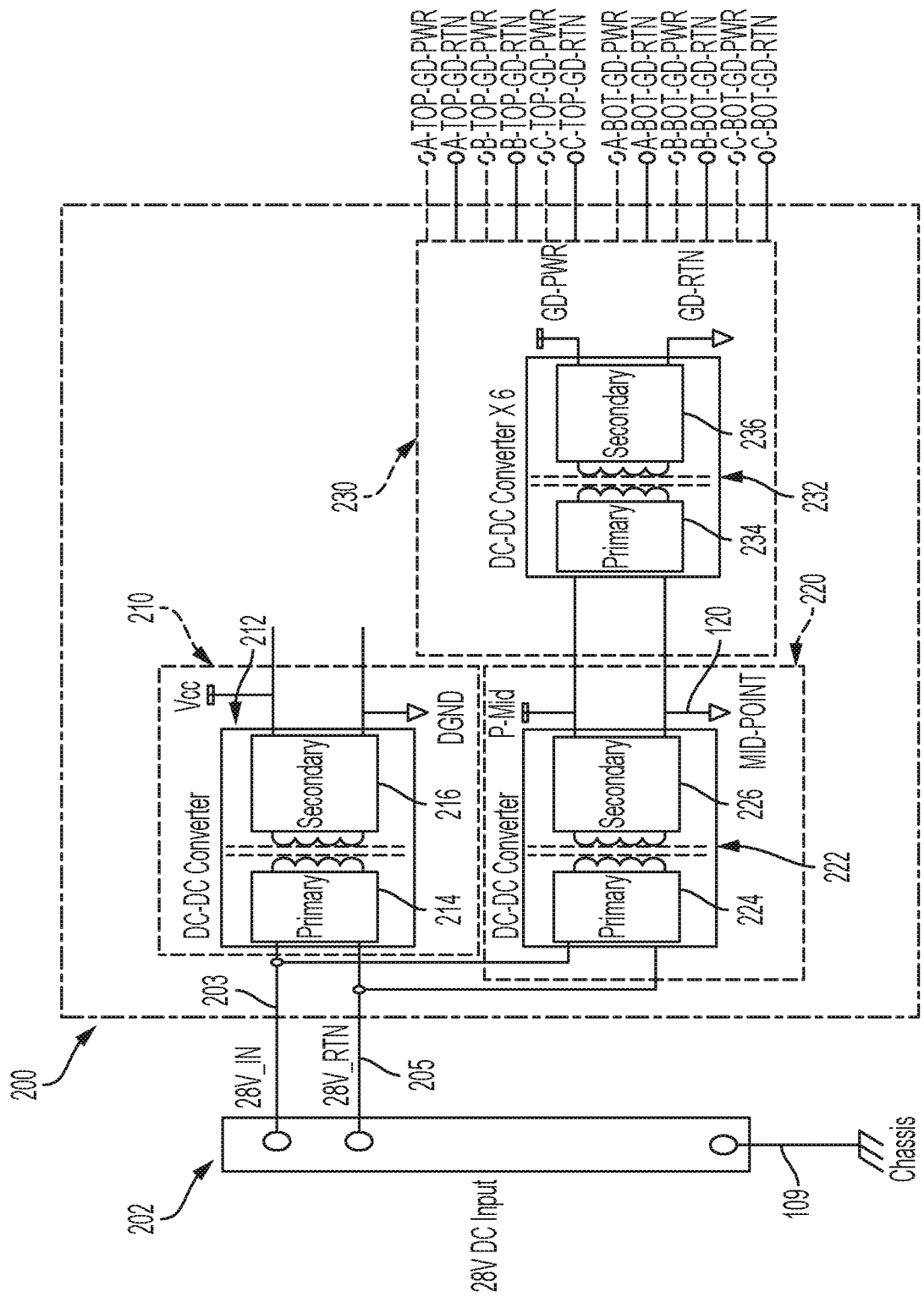
FIG. 2 depicts a gate driver unit power supply included in the motor drive system shown of FIG. 1 according to a non-limiting embodiment.

Turning now to FIG. 2, a multi-mode DC power supply 200 is illustrated according to a non-limiting embodiment. The multi-mode DC power supply 200 is in signal communication with a DC power source 202, and is configured to provide the DC power (P-MID) to each of the gate driver units 154n (see FIG. 1) described herein. It should be appreciated that the multi-mode DC power supply 200 is just one example of a multi-mode DC power supply 200 and that other multi-mode DC power supply designs can be implemented in the motor drive system 100 to provide the DC power (P-MID) without departing from the scope of the present inventive teachings.

With continued reference to FIG. 2, the DC power source 202 includes a DC input rail (e.g., 28V_IN) 203, a DC return rail (e.g., 28V_RTN) 205, and a chassis or earth connection (e.g., "Chassis") 207. The multi-mode DC power supply 200 includes a digital control power source 210, a mid-point power source 220, and a gate driver power source 230.

In one or more non-limiting embodiments, the digital control power source 210 and the mid-point power source 220 are connected in parallel with one another. Accordingly, the digital control power source 210 can be utilized to provide power to the digital control logic circuitry (e.g., a digital controller) while the mid-point power source 220 can be utilized to provide power to the isolated gate drivers 158n.

The digital control power source 210 is constructed using a first DC-DC converter 212 that includes a first primary-side winding 214 and a first secondary-side winding 216 disposed adjacent to the first primary-side winding 214. The first primary-side winding 214 includes a first end connected to the DC input rail 203 and an opposing second end connected to the DC return rail 205. The secondary-side winding 216 includes a first end configured to provide a digital control voltage (Vcc) and an opposing second end connected to a digital ground reference (DGND), which are provided to the digital isolators 156n as shown in FIG. 1.

The mid-point power source 220 is constructed using a second DC-DC converter 222, which is configured to provide a mid-point power source (P-mid) for powering the isolated gate drivers 158n. In one or more non-limiting embodiments, the midpoint power source (P-Mid) provides a voltage ranging, for example, from about 15V to about 18V. The DC-DC converter 222 is also configured to provide safety isolation in the event of a failure within an isolated gate drivers 158n connected thereto.

The second DC-DC converter 222 includes a second primary-side winding 224 and a second secondary-side winding 226 disposed adjacent to the second primary-side winding 224. The second primary-side winding 224 includes a first end connected to in common with the DC input rail 203 and the first end of the first primary winding 214. The opposing second end is connected in common with the DC return rail 205 and the second end of the first primary-side winding 214. The secondary-side winding 226 includes a first end configured to provide the midpoint power (P-Mid) and an opposing second end connected to the mid-point reference (MID-POINT) 120 established by the split DC link mid-point circuit 106 (see FIG. 1).

The gate driver power source 230 is constructed one or more gate driver DC-DC converters 232. Each gate driver DC-DC converter 232 includes a third primary-side winding 234 and a third secondary-side winding 236 disposed adjacent to the third primary-side winding 234. The third primary-side winding 234 includes a first end connected to the first end of the second secondary-side winding 226 to receive the midpoint power (P-MID). The second end of the third primary-side winding 234 is connected in common with the second end of secondary winding 226 and the mid-point reference (MID-POINT) 120. A first end of the third secondary-side winding 236 provides gate driver power (GD-PWR) and the opposing second end of the third secondary-side winding 236 is connected to a gate driver return reference point (GD-RTN). In one or more non-limiting embodiments, the gate driver power source 230 employs a gate driver DC-DC converter 232 for each gate driver unit 154n included in the motor drive system 100. Accordingly, each gate driver DC-DC converter 232 provides a gate driver power (GD-PWR) and a gate driver return reference point (GD-RTN) for a respective isolated gate driver 158n included in the power inverter 108. As described herein, the non-limiting embodiment of the motor drive system 100 described herein employs six (6) gate driver DC-DC converters 232. It should be appreciated, however, that more or less gate driver DC-DC converters 232 can be employed without departing from the scope of the inventive teachings.

Figure 3:
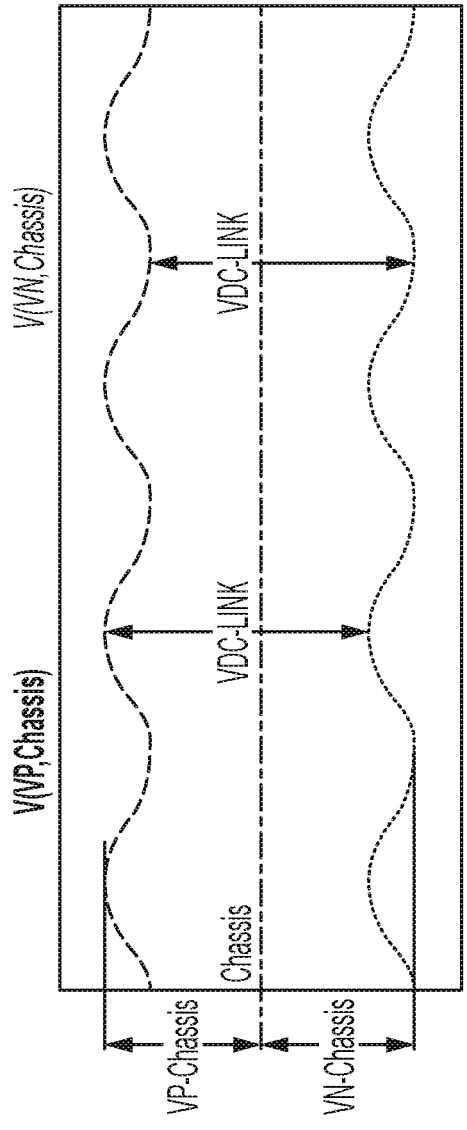
FIG. 3 is a signal diagram depicting voltages of the positive and negative chassis rails with respect to the VDC-LINK included in the motor drive system of FIG. 1 according to a non-limiting embodiment.

Turning now to FIG. 3, a signal diagram illustrates the behavior of the positive rail (VP) and negative rail (VN) voltages with respect to the chassis reference 109. The differential between positive rail (VP) and negative rail (VN) effectively equates to the DC link voltage (VDC-LINK) appearing across the DC-link 104.

Figure 4:
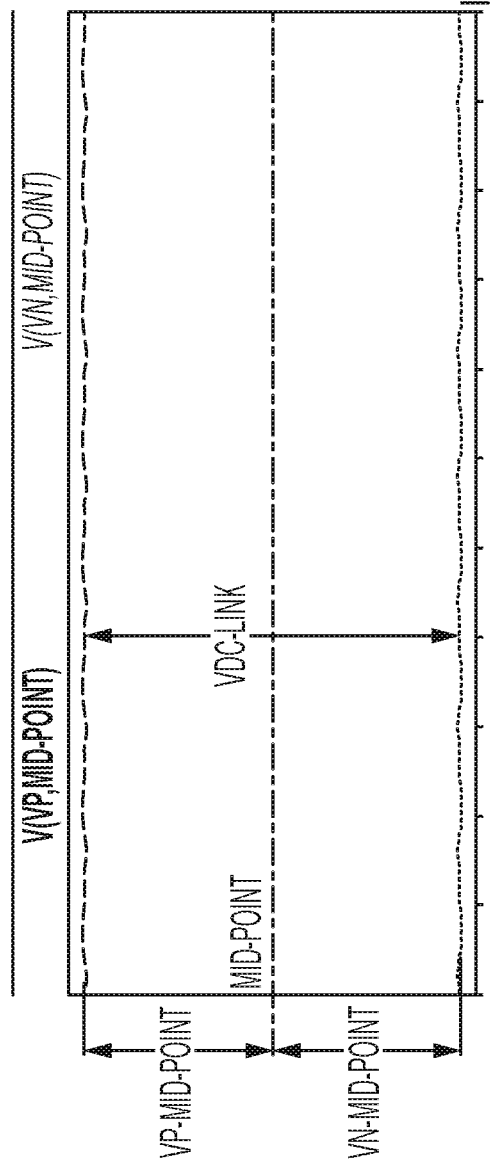
FIG. 4 is a signal diagram depicting voltages of the positive and negative mid-point rails with respect to the VDC-LINK included in the motor drive system of FIG. 1 according to a non-limiting embodiment.

FIG. 4 is a signal diagram that illustrates the behavior of the positive rail (VP) and negative rail (VN) voltages with respect to the mid-point reference (MID-POINT) 120. Viewing voltage of FIG. 4 with respect to FIG. 3, it can be seen that the isolation voltage across an isolated gate driver 154n is equivalent to the voltage difference between the mid-point reference (MID-POINT) 120 and the corresponding voltage rail (e.g., VP/VN). In addition, comparing FIG. 4 with respect to FIG. 3 shows that the isolation voltage across an isolated gate driver 154n (i.e., the voltage difference between the MID-POINT 120 and VP/VN) is not influenced by the variation in the common mode voltages (VP-to-Chassis, VN-to-Chassis) because the voltage at VP or VN with respect to MID-POINT 109 is always half the DC link voltage (VDC-LINK) appearing across the DC-link 104 (i.e., ±VDC-LINK/2). The isolation voltage across an isolated gate driver 154n (i.e., the voltage difference between the MID-POINT 120 and VP/VN) is also not influenced in the presence of bus faults where the V-POS or V-NEG become connected to a portion of the aircraft structure.

As described herein, one or more non-limiting embodiments described herein provide a motor drive system that includes a gate drive grounding scheme for wide input DC link voltages. The gate drive ground scheme establishes a mid-point reference (referred to herein as "MID POINT") that is connected from gate drive area (between digital isolator and isolated gate drive) to an internally created split DC link voltage that is established by a split DC line voltage circuit. The mid-point connection (MID POINT) prevents ground faults occurring on the conductive casing (e.g., chassis) from propagating into the gate driver units, while reducing or even completely removing noise injection into the gate driver units. In addition, the split DC link voltage can be utilized as a mid-point reference to the gate drive isolated region.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The present embodiments may be a system, a method, and/or a computer program product at any possible technical detail level of integration. The computer program product may include a computer readable storage medium (or media) having computer readable program instructions thereon for causing a processor to carry out aspects of the present disclosure.

The flowchart and block diagrams in the figures illustrate the architecture, functionality, and operation of possible implementations of systems, methods, and computer program products according to various embodiments. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the present disclosure has been described in detail in connection with only a limited number of embodiments, it should be readily understood that the present disclosure is not limited to such disclosed embodiments. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments.

What is claimed is:

1. A motor drive system comprising:
   a direct current (DC) bus configured to provide a DC link voltage, the DC bus including a DC link capacitor connected thereacross;
   a split DC link mid-point circuit connected in parallel with the DC link capacitor, the split DC link mid-point circuit configured to establish a mid-point reference based on the DC link voltage; and
   a power inverter in signal communication with the DC bus, the power inverter including at least one gate driver unit configured to drive a switch, the at least one gate driver unit including a mid-point ground connection that is connected to the mid-point reference.

2. The motor drive system of claim 1, wherein the split DC link mid-point circuit comprises:
   a plurality of capacitors that are connected across the DC bus; and
   a plurality of resistors that are connected in parallel with the plurality of capacitors,
   wherein the plurality of capacitors and the plurality of resistors are connected to one another at a mid-point node to establish the mid-point reference.

3. The motor drive system of claim 2, wherein a voltage at the mid-point node is half the DC link voltage.

4. The motor drive system of claim 3, wherein the at least one gate driver unit comprises:
   an isolated gate driver configured to drive the switch based on a PWM signal, the isolated gate driver including a second mid-point voltage connection that receives the mid-point voltage and a second mid-point ground connection that is connected to the mid-point reference; and
   a digital isolator configured to establish an isolation barrier between digital control circuitry and the isolated gate driver, and configured to transfer the PWM signal across the isolation barrier to the isolated gate driver.

5. The motor drive system of claim 4, wherein the switch is connected to a load, and wherein the isolated gate driver operates the switch to drive the load.

6. The motor drive system of claim 5, wherein the load is a three-phase motor.

7. The motor drive system of claim 3, wherein the split DC link mid-point circuit establishes a voltage divider configured to provide voltage monitoring of the DC link voltage.

8. The motor drive system of claim 2, wherein the split DC link mid-point circuit comprises:
   a first capacitor and a second capacitor connected in series with one another to define a pair of capacitors that are connected across the DC bus; and
   a first resistor and a second resistor connected in series with one another to define a pair of resistors that are connected in parallel with the pair of capacitors,
   wherein the pair of capacitors and the pair of resistors each have a center-tap that is connected to the mid-point node to establish the mid-point reference.

9. The motor drive system of claim 8, wherein the split DC link mid-point circuit further comprises:
   the first capacitor including a first terminal connected to a positive rail of the DC bus;
   the second capacitor including a first terminal connected to an opposing terminal of the first capacitor to form a first center node and including a second terminal connected to a negative rail of the DC bus;
   the first resistor including a first terminal connected to the positive rail of the DC bus; and
   the second resistor including a first terminal connected to an opposing second terminal of the first resistor to form a second center node and including a second terminal connected to the negative rail of the DC bus,
   wherein the first center node and the second center node are commonly connected to the mid-point node to establish the mid-point reference.

10. A method of grounding a gate driver unit included in a motor drive system, the method comprising:
    delivering a DC link voltage across a direct current (DC) link capacitor connected across a DC bus;
    connecting a split DC link mid-point circuit in parallel with the DC link capacitor to establish a mid-point reference based on the DC link voltage;
    grounding the gate driver to the mid-point reference;
    delivering the DC link voltage to a power inverter in signal communication with the DC bus and using the DC link voltage to operate a gate driver unit included in the power inverter; and
    driving a switch included in the power inverter in response to powering the gate driver unit.

11. The method of claim 10, wherein establishing the mid-point reference comprises:
    connecting a plurality of capacitors across the DC bus;
    connecting a plurality of resistors in parallel with the plurality of capacitors; and
    connecting the plurality of capacitors and the plurality of resistors to one another at a common mid-point node to establish the mid-point reference.

12. The method of claim 11, wherein a voltage at the mid-point node is half the DC link voltage.

13. The method of claim 12, wherein operating the gate driver unit comprises:
    establishing, using a digital isolator, an isolation barrier between digital control circuitry and an isolated gate driver included in the gate driver unit;
    delivering a PWM signal to the digital isolator;
    transferring the PWM signal across the isolation barrier and to the isolated gate driver; and
    operating the isolated gate driver based on the PWM signal so as to drive the switch.

14. The method of claim 13, wherein operating the gate driver unit further comprises:
    connecting voltage inputs of the digital isolator and the isolated gate driver to a common mid-point voltage; and
    connecting ground inputs of the digital isolator and the isolated gate driver to the mid-point reference.

15. The method of claim 12, further comprising using the split DC link mid-point circuit as a voltage divider monitoring to monitor the DC link voltage.

16. The method of claim 11, wherein establishing the mid-point reference further comprises:
    connecting a first capacitor and a second capacitor in series with one another to define a pair of capacitors that are connected across the DC bus;
    connecting a first resistor and a second resistor in series with one another to define a pair of resistors that are connected in parallel with the pair of capacitors; and
    connecting a center-tap of the pair of capacitors and a center-tap of the pair of resistors to the mid-point node to establish the mid-point reference.

17. The method of claim 16, wherein establishing the mid-point reference further comprises:
    connecting a first terminal of the first capacitor to a positive rail of the DC bus;

connecting an opposing second terminal of the first capacitor to a first terminal of a second capacitor to form a first center node;

connecting an opposing second terminal of the second capacitor to a negative rail of the DC bus;

connecting a first terminal of the first resistor to the positive rail of the DC bus;

connecting an opposing second terminal of the first resistor to a first terminal of a second resistor to form a second center node;

connecting an opposing second terminal of the second resistor to the negative rail of the DC bus; and connecting the first center node and the second center node in common with the mid-point node to establish the mid-point reference.

\* \* \* \* \*